(12) United States Patent
Zhou et al.

(10) Patent No.: US 12,265,229 B2
(45) Date of Patent: Apr. 1, 2025

(54) METHOD AND APPARATUS FOR COHERENCE SCRAMBLING IN METROLOGY APPLICATIONS

(71) Applicant: ASML Netherlands B.V., Veldhoven (NL)

(72) Inventors: Zili Zhou, Veldhoven (NL); Janneke Ravensbergen, Würzburg (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 17/768,851

(22) PCT Filed: Sep. 30, 2020

(86) PCT No.: PCT/EP2020/077340
§ 371 (c)(1),
(2) Date: Apr. 13, 2022

(87) PCT Pub. No.: WO2021/073873
PCT Pub. Date: Apr. 22, 2021

(65) Prior Publication Data
US 2024/0134208 A1 Apr. 25, 2024
US 2024/0231115 A9 Jul. 11, 2024

(30) Foreign Application Priority Data
Oct. 14, 2019 (EP) .................... 19202907

(51) Int. Cl.
*G02B 27/09* (2006.01)
(52) U.S. Cl.
CPC ..... *G02B 27/0927* (2013.01); *G02B 27/0944* (2013.01); *G02B 27/0994* (2013.01)

(58) Field of Classification Search
CPC ............ G02B 27/0927; G02B 27/0944; G02B 27/0994; G02B 27/48; G03F 7/7085; G03F 9/7034; G03F 9/7046
See application file for complete search history.

(56) References Cited

U.S. PATENT DOCUMENTS

| 6,859,326 B2 | 2/2005 | Sales |
| 6,952,253 B2 | 10/2005 | Lof et al. |

(Continued)

FOREIGN PATENT DOCUMENTS

| CN | 1688907 A | 10/2005 |
| CN | 102494299 A | 6/2012 |

(Continued)

OTHER PUBLICATIONS

International Search Report and Written Opinion of the International Searching Authority directed to related International Patent Application No. PCT/EP2020/077340, mailed Feb. 11, 2021; 14 pages.

(Continued)

*Primary Examiner* — Deoram Persaud
(74) *Attorney, Agent, or Firm* — Sterne, Kessler, Goldstein & Fox P.L.L.C.

(57) ABSTRACT

Disclosed is a pupil shaping arrangement for obtaining a defined pupil intensity profile for a metrology illumination beam configured for use in a metrology application. The pupil shaping arrangement comprises an engineered diffuser (ED) having a defined far-field profile configured to impose said defined pupil intensity profile on said metrology illumination beam. The pupil shaping arrangement may further comprise a multimode fiber (MMF) and be configured to reduce spatial coherence of coherent radiation.

11 Claims, 7 Drawing Sheets

(56) References Cited

U.S. PATENT DOCUMENTS

| | | | |
|---|---|---|---|
| 6,961,116 B2 | 11/2005 | Den Boef et al. | |
| 7,265,364 B2 | 9/2007 | Teunissen et al. | |
| 7,646,471 B2 | 1/2010 | Teunissen et al. | |
| 7,701,577 B2 | 4/2010 | Straaijer et al. | |
| 7,791,724 B2 | 9/2010 | Den Boef et al. | |
| 8,115,926 B2 | 2/2012 | Straaijer | |
| 8,553,227 B2 | 10/2013 | Jordanoska | |
| 8,681,312 B2 | 3/2014 | Straaijer | |
| 8,692,994 B2 | 4/2014 | Straaijer | |
| 8,792,096 B2 | 7/2014 | Straaijer | |
| 8,797,554 B2 | 8/2014 | Straaijer | |
| 8,823,922 B2 | 9/2014 | Den Boef | |
| 9,160,137 B1 | 10/2015 | Abdolvand et al. | |
| 10,234,767 B2 | 3/2019 | Goorden et al. | |
| 2007/0165202 A1* | 7/2007 | Koehler | G03F 7/702 355/67 |
| 2010/0233600 A1 | 9/2010 | Den Boef et al. | |
| 2010/0328655 A1 | 12/2010 | Den Boef | |
| 2011/0026032 A1 | 2/2011 | Den Boef et al. | |
| 2011/0096316 A1* | 4/2011 | Brotsack | G03F 7/70191 355/67 |
| 2011/0102753 A1 | 5/2011 | Van De Kerkhof et al. | |
| 2011/0249244 A1 | 10/2011 | Leewis et al. | |
| 2012/0044464 A1* | 2/2012 | Sqalli | G02B 27/48 353/121 |
| 2012/0044470 A1 | 2/2012 | Smilde et al. | |
| 2012/0262782 A1* | 10/2012 | Lee | F21V 9/00 359/385 |
| 2013/0162996 A1 | 6/2013 | Straaijer et al. | |
| 2015/0261097 A1 | 9/2015 | Mathijssen et al. | |
| 2016/0161863 A1 | 6/2016 | Den Boef et al. | |
| 2016/0370717 A1 | 12/2016 | Den Boef et al. | |
| 2019/0107781 A1 | 4/2019 | Tinnemans et al. | |
| 2020/0333612 A1* | 10/2020 | Manassen | G02B 27/123 |

FOREIGN PATENT DOCUMENTS

| | | |
|---|---|---|
| CN | 103345013 A | 10/2013 |
| CN | 105589300 A | 5/2016 |
| CN | 107860713 A | 3/2018 |
| CN | 110275313 A | 9/2019 |
| EP | 1 628 164 A2 | 2/2006 |
| EP | 3 279 736 A1 | 2/2018 |
| EP | 3 480 554 A1 | 5/2019 |
| EP | 3 531 191 A1 | 8/2019 |
| GB | 2 467 181 A | 7/2010 |
| TW | 2018-07509 A | 3/2018 |
| WO | WO 2016/102127 A1 | 6/2016 |
| WO | WO 2019/048342 A1 | 3/2019 |
| WO | WO 2019/166190 A1 | 9/2019 |
| WO | WO 2019/197117 A1 | 10/2019 |

OTHER PUBLICATIONS

Giger et al., "Laser Speckle Reduction based on electroactive polymers," The 1st Advanced Lasers and Photon Sources (ALPS'12), Apr. 27, 2012; 1 pages.

* cited by examiner

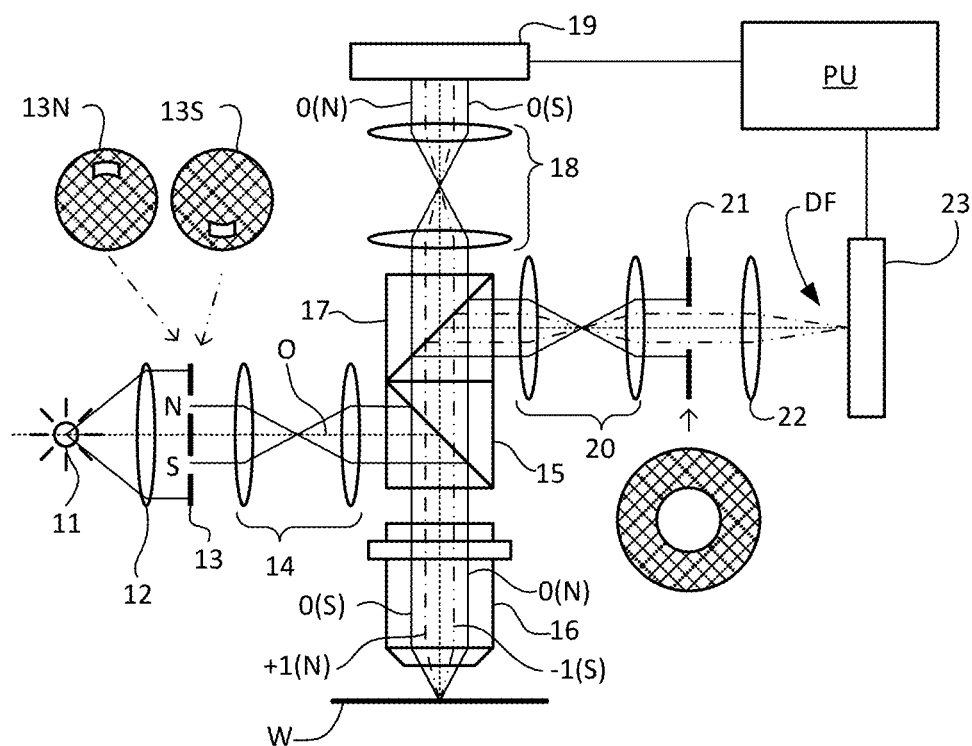
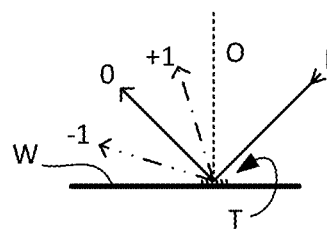
Fig. 5B
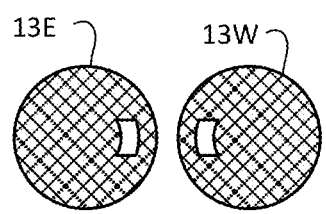
Fig. 5C
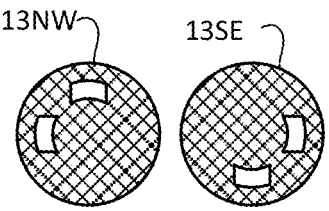
Fig. 5D
Fig. 5A

Fig. 9A
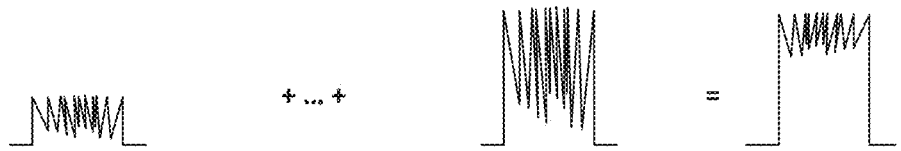
Fig. 9B
Fig. 10A
Fig. 10B
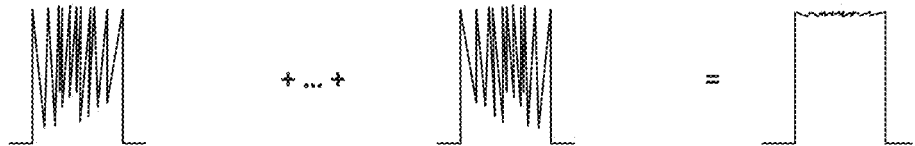
Fig. 10C

OP

OP

METHOD AND APPARATUS FOR COHERENCE SCRAMBLING IN METROLOGY APPLICATIONS

CROSS REFERENCE TO RELATED APPLICATIONS

This application claims priority of EP application 19202907.2 which was filed on 2019 Oct. 14 and which is incorporated herein in its entirety by reference.

FIELD

The present invention relates to a method and apparatus for coherence scrambling in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

Metrology tools are used in many aspects of the IC manufacturing process, for example as alignment tools for proper positioning of a substrate prior to an exposure, leveling tools to measure a surface topology of the substrate, for e.g., focus control and scatterometry based tools for inspecting/measuring the exposed and/or etched product in process control. In each case, a radiation source is required. For various reasons, including measurement robustness and accuracy, broadband or white light radiation sources are increasingly used for such metrology applications. A particular radiation source proposed outputs highly spatially coherent radiation. This can be beneficial for some applications; however, in other applications it may lead to undesirable effects such as speckle. It would be desirable to reduce the spatial coherence of such illumination. Alternatively and addition it may be desirable to reduce source power requirements for radiation sources.

SUMMARY

In a first aspect of the invention there is provided a pupil shaping arrangement for obtaining a defined pupil intensity profile for a metrology illumination beam configured for use in a metrology application, the pupil shaping arrangement comprising: an engineered diffuser having a defined far-field profile configured to impose said defined pupil intensity profile on said metrology illumination beam.

Other aspects of the invention comprise a radiation source and metrology device comprising the pupil shaping arrangement of the first aspect.

BRIEF DESCRIPTION OF THE DRAWINGS

Embodiments of the invention will now be described, by way of example only, with reference to the accompanying schematic drawings, in which:

FIGS. 5A-5D comprise FIG. 5A a schematic diagram of a dark field scatterometer which may comprise a radiation source arrangement according to embodiments of the invention, FIG. 5B a detail of diffraction spectrum of a target grating for a given direction of illumination FIG. 5C a second pair of illumination apertures providing further illumination modes in using the scatterometer for diffraction based overlay measurements and FIG. 5D a third pair of illumination apertures combining the first and second pair of apertures.

FIG. 9A-9B illustrate FIG. 9A plots of intensity across the cross section of the input pupil and output pupil; and FIG. 9B the effect on individual modes output from the multi-mode fiber; for the arrangement of FIG. 8 when using a Gaussian engineered diffuser according to an embodiment of the invention;

FIGS. 10A-10B illustrate plots of intensity across the cross section of the input pupil and output pupil for two alternative customized engineered diffusers used in accordance with embodiments of the invention; and FIG. 10C illustrates the effect on individual modes output from the multimode fiber when using the engineered diffuser of FIG. 10B;

FIG. 12B a metrology arrangement using illumination with pupil shaped by the customized engineered diffuser of FIG. 11B;

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
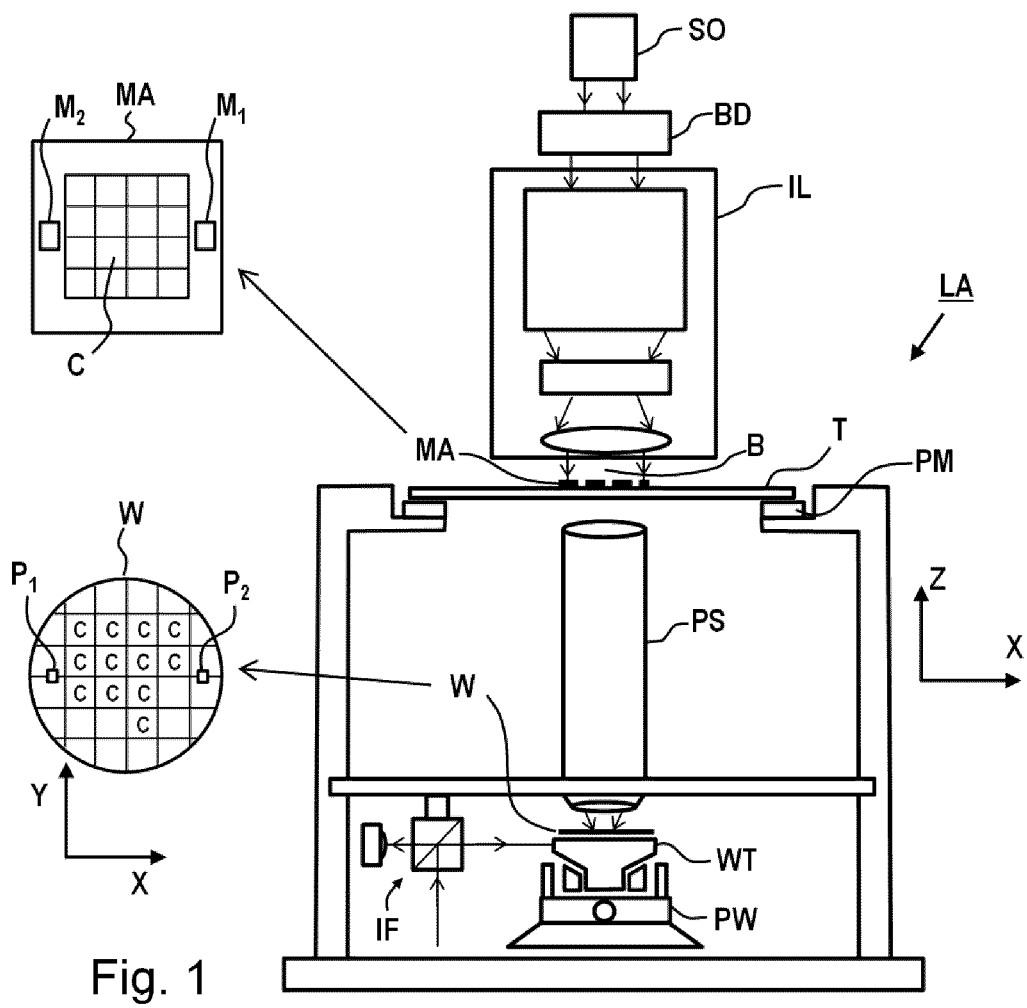
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

Figure 2:
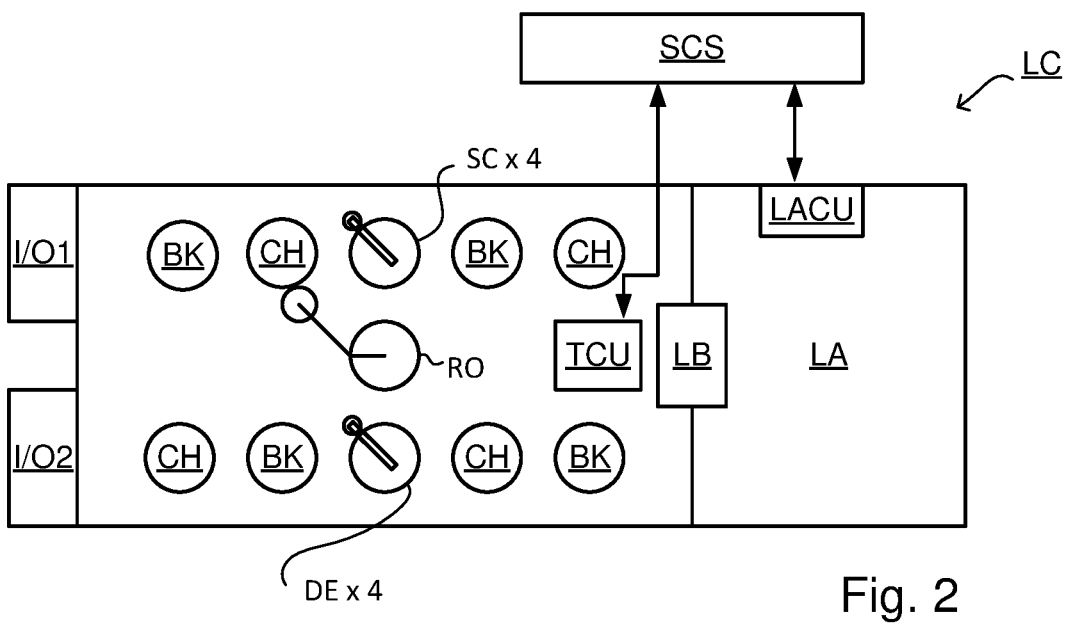
FIG. 2 depicts a schematic overview of a lithographic cell.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C. As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
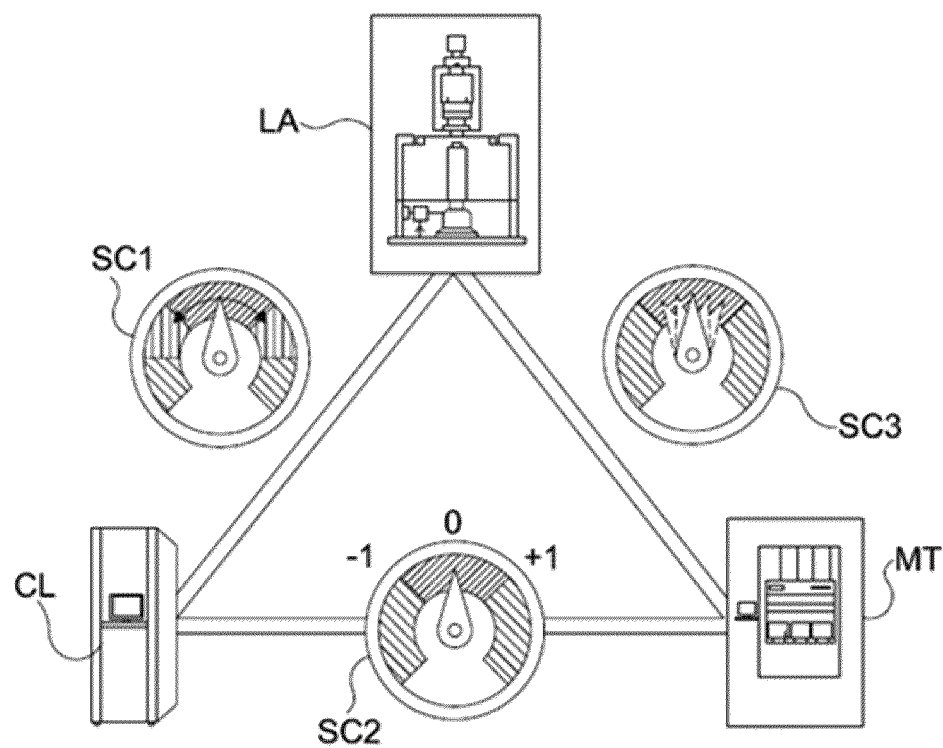
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is a ellipsometric scatterometer. The ellipsometric scatterometer allows for determining parameters of a lithographic process by measuring scattered radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922,587, 13/000,229, 13/033,135, 13/533,110 and 13/891,410 incorporated herein by reference in their entirety.

Figure 4:
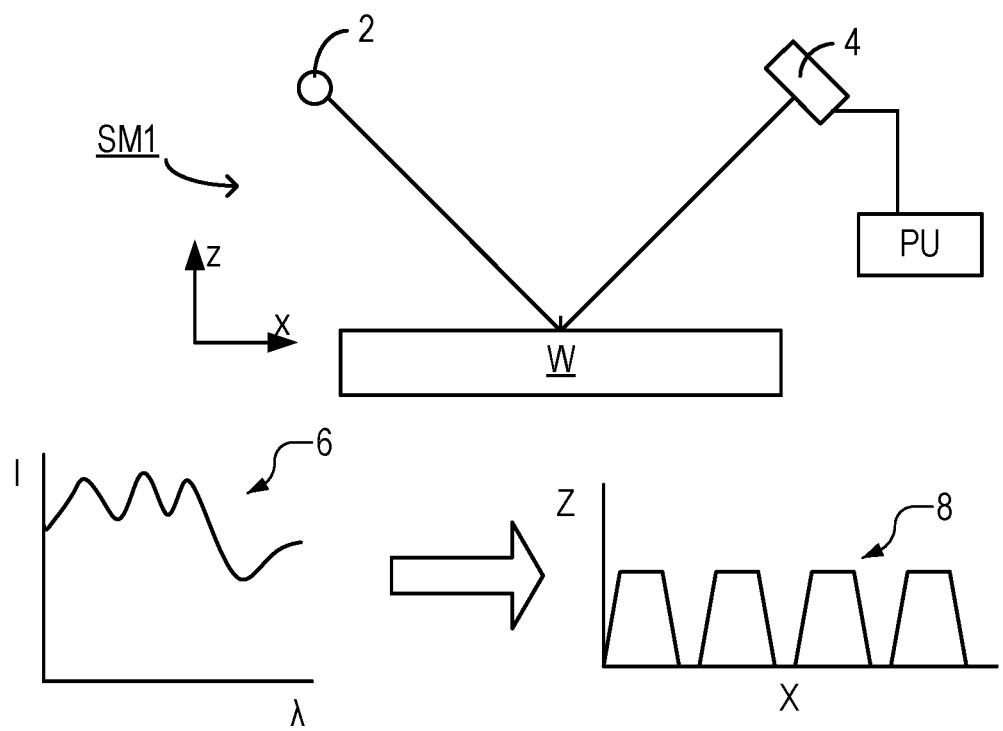
FIG. 4 depicts a schematic overview of a scatterometry apparatus used as a metrology device, which may comprise a radiation source arrangement according to embodiments of the invention.

A metrology apparatus, such as a scatterometer, is depicted in FIG. 4. It comprises a broadband (white light) radiation projector 2 which projects radiation onto a substrate W. The reflected or scattered radiation is passed to a spectrometer detector 4, which measures a spectrum 6 (i.e. a measurement of intensity as a function of wavelength) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

A metrology apparatus suitable for use in embodiments of the invention is shown in FIG. 5(a). A target T and diffracted rays of measurement radiation used to illuminate the target are illustrated in more detail in FIG. 5(b). The metrology apparatus illustrated is of a type known as a dark field metrology apparatus. The metrology apparatus may be a stand-alone device or incorporated in either the lithographic apparatus LA, e.g., at the measurement station, or the lithographic cell LC. An optical axis, which has several branches throughout the apparatus, is represented by a dotted line O. In this apparatus, light emitted by source 11 (e.g., a xenon lamp) is directed onto substrate W via a beam splitter 15 by an optical system comprising lenses 12, 14 and objective lens 16. These lenses are arranged in a double sequence of a 4F arrangement. A different lens arrangement can be used, provided that it still provides a substrate image onto a detector, and simultaneously allows for access of an intermediate pupil-plane for spatial-frequency filtering. Therefore, the angular range at which the radiation is incident on the substrate can be selected by defining a spatial intensity distribution in a plane that presents the spatial spectrum of the substrate plane, here referred to as a (conjugate) pupil plane. In particular, this can be done by inserting an aperture plate 13 of suitable form between lenses 12 and 14, in a plane which is a back-projected image of the objective lens pupil plane. In the example illustrated, aperture plate 13 has different forms, labeled 13N and 13S, allowing different illumination modes to be selected. The illumination system in the present examples forms an off-axis illumination mode. In the first illumination mode, aperture plate 13N provides off-axis from a direction designated, for the sake of description only, as 'north'. In a second illumination mode, aperture plate 13S is used to provide similar illumination, but from an opposite direction, labeled 'south'. Other modes of illumination are possible by using different apertures. The rest of the pupil plane is desirably dark as any unnecessary light outside the desired illumination mode will interfere with the desired measurement signals.

As shown in FIG. 5(b), target T is placed with substrate W normal to the optical axis O of objective lens 16. The substrate W may be supported by a support (not shown). A ray of measurement radiation I impinging on target T from an angle off the axis O gives rise to a zeroth order ray (solid line 0) and two first order rays (dot-chain line+1 and double dot-chain line −1). It should be remembered that with an overfilled small target, these rays are just one of many parallel rays covering the area of the substrate including metrology target T and other features. Since the aperture in plate 13 has a finite width (necessary to admit a useful quantity of light, the incident rays I will in fact occupy a range of angles, and the diffracted rays 0 and +1/−1 will be spread out somewhat. According to the point spread function of a small target, each order +1 and −1 will be further spread over a range of angles, not a single ideal ray as shown. Note that the grating pitches of the targets and the illumination angles can be designed or adjusted so that the first order rays entering the objective lens are closely aligned with the central optical axis. The rays illustrated in FIGS. 5(a) and 3(b) are shown somewhat off axis, purely to enable them to be more easily distinguished in the diagram.

At least the 0 and +1 orders diffracted by the target T on substrate W are collected by objective lens 16 and directed back through beam splitter 15. Returning to FIG. 5(a), both the first and second illumination modes are illustrated, by designating diametrically opposite apertures labeled as north (N) and south (S). When the incident ray I of measurement radiation is from the north side of the optical axis, that is when the first illumination mode is applied using aperture plate 13N, the +1 diffracted rays, which are labeled +1(N), enter the objective lens 16. In contrast, when the second illumination mode is applied using aperture plate 13S the −1 diffracted rays (labeled 1(S)) are the ones which enter the lens 16.

A second beam splitter 17 divides the diffracted beams into two measurement branches. In a first measurement branch, optical system 18 forms a diffraction spectrum (pupil plane image) of the target on first sensor 19 (e.g. a CCD or CMOS sensor) using the zeroth and first order diffractive beams. Each diffraction order hits a different point on the sensor, so that image processing can compare and contrast orders. The pupil plane image captured by sensor 19 can be used for focusing the metrology apparatus and/or normalizing intensity measurements of the first order beam. The pupil plane image can also be used for many measurement purposes such as reconstruction.

In the second measurement branch, optical system 20, 22 forms an image of the target T on sensor 23 (e.g. a CCD or CMOS sensor). In the second measurement branch, an aperture stop 21 is provided in a plane that is conjugate to the pupil-plane. Aperture stop 21 functions to block the zeroth order diffracted beam so that the image of the target formed on sensor 23 is formed only from the −1 or +1 first order beam. The images captured by sensors 19 and 23 are output to processor PU which processes the image, the function of which will depend on the particular type of measurements being performed. Note that the term 'image' is used here in a broad sense. An image of the grating lines as such will not be formed, if only one of the −1 and +1 orders is present.

The particular forms of aperture plate 13 and field stop 21 shown in FIG. 5 are purely examples. In another embodiment of the invention, on-axis illumination of the targets is used and an aperture stop with an off-axis aperture is used to pass substantially only one first order of diffracted light to the sensor. In yet other embodiments, 2nd, 3rd and higher order beams (not shown in FIG. 5) can be used in measurements, instead of or in addition to the first order beams.

In order to make the measurement radiation adaptable to these different types of measurement, the aperture plate 13 may comprise a number of aperture patterns formed around a disc, which rotates to bring a desired pattern into place. Note that aperture plate 13N or 13S can only be used to measure gratings oriented in one direction (X or Y depending on the set-up). For measurement of an orthogonal grating, rotation of the target through 90° and 270° might be implemented. Different aperture plates are shown in FIGS. 3(c) and (d). The use of these, and numerous other variations and applications of the apparatus are described in prior published applications, mentioned above.

Figure 6:
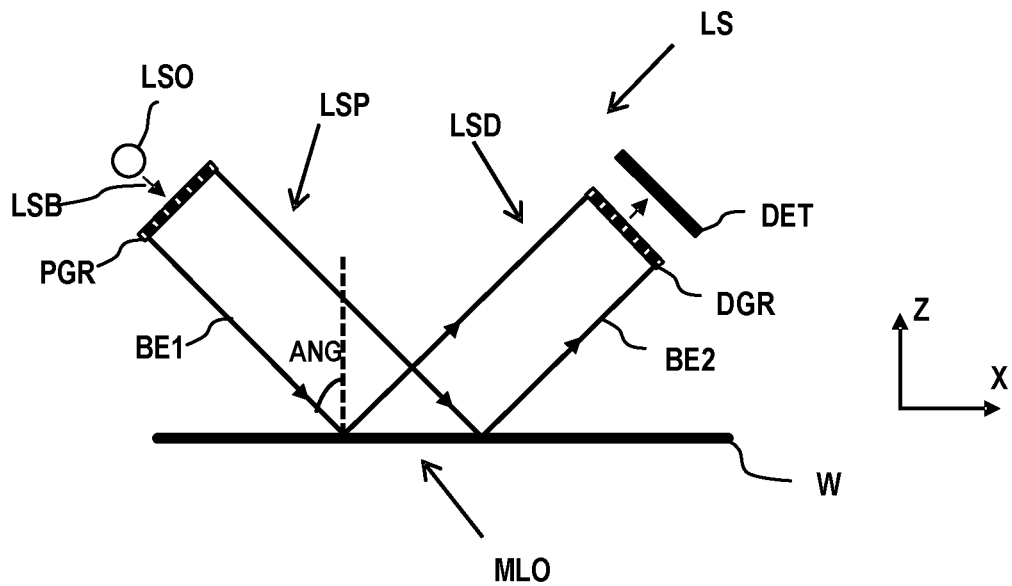
FIG. 6 depicts a schematic overview of a level sensor apparatus, which may comprise a radiation source arrangement according to embodiments of the invention.

An example of a level or height sensor LS as known in the art is schematically shown in FIG. 6, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband light source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

Another type of metrology tool used in IC manufacture is an alignment sensor. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

Figure 7:
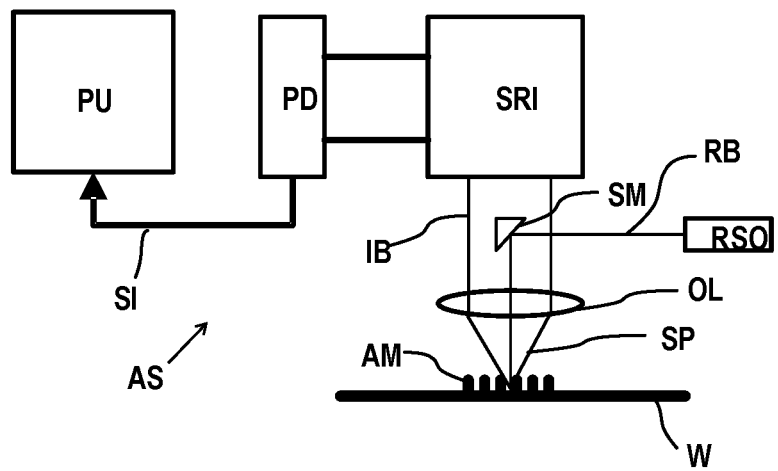
FIG. 7 depicts a schematic overview of an alignment sensor apparatus, which may comprise a radiation source arrangement according to embodiments of the invention.

FIG. 7 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Another specific type of metrology sensor, which has both alignment and product/process monitoring metrology applications, has recently been recently described in European applications EP18195488.4 and EP19150245.9, which are incorporated herein by reference. This describes a metrology device with optimized coherence. More specifically, the metrology device is configured to produce a plurality of spatially incoherent beams of measurement illumination, each of said beams (or both beams of measurement pairs of said beams, each measurement pair corresponding to a measurement direction) having corresponding regions within their cross-section for which the phase relationship between the beams at these regions is known; i.e., there is mutual spatial coherence for the corresponding regions. The methods described herein may be used to generate the spatially incoherent beams.

Such a metrology device is able to measure small pitch targets with acceptable (minimal) interference artifacts (speckle) and will also be operable in a dark-field mode. Such a metrology device may be used as a position or alignment sensor for measuring substrate position (e.g., measuring the position of a periodic structure or alignment mark with respect to a fixed reference position). However, the metrology device is also usable for measurement of overlay (e.g., measurement of relative position of periodic structures in different layers, or even the same layer in the case of stitching marks). The metrology device is also able to measure asymmetry in periodic structures, and therefore could be used to measure any parameter which is based on a target asymmetry measurement (e.g., overlay using diffraction based overlay (DBO) techniques or focus using diffraction based focus (DBF) techniques).

A main concept of the proposed metrology device is to induce spatial coherence in the measurement illumination only where required. More specifically, spatial coherence is induced between corresponding sets of pupil points in each of the off-axis beams. More specifically, a set of pupil points comprises a corresponding single pupil point in each of the off-axis beams, the set of pupil points being mutually spatially coherent, but where each pupil point is incoherent with respect to all other pupil points in the same beam. By optimizing the coherence of the measurement illumination in this manner, it becomes feasible to perform dark-field off-axis illumination on small pitch targets, but with minimal speckle artifacts as each off-axis beam is spatially incoherent.

For optical semiconductor metrology, inspection applications, such as in any of the aforementioned metrology tools, a bright light source simultaneously covering a broad wavelength range (e.g., a white light range or a rage from UV to IR) is often desirable. Such a broadband light source can help improve the flexibility and robustness of applications by allowing wafers with different material characteristics to be optically examined in the same setup/system without a need for any hardware change (e.g., changing a light source so as to have a specific wavelength). Allowing the wavelength to be optimized for a specific application also means that the accuracy of measurements can be further increased. Gas lasers, which are based on the gas-discharge effect to simultaneously emit multiple wavelengths, can be used in these applications. Alternatively a fiber-based broadband or white light laser, also called a supercontinuum laser, is able to emit radiation with a broad spectral coverage, e.g., from UV to IR. These are only a couple of examples of radiation sources for which the methods disclosed herein are applicable.

In many such broadband or white light sources, the radiation output is highly (spatially) coherent, which is desirable in many applications. However, in other applications, less coherent radiation may be preferred; e.g., to reduce or eliminate the speckle phenomenon inherent in using highly spatially coherent radiation. Methods will now be disclosed which reduce the spatial coherence of radiation (e.g., from a highly coherent source).

One method of reducing spatial coherence is by using a static or moving diffuser in combination with a multimode (MM) fiber. For the static implementation the mechanism of coherence reduction is modal dispersion. Moving the diffuser reduces the spatial coherence further. With the help of the diffuser, multiple modes are excited in the multimode fiber. Due to modal dispersion, each mode arrives at the end of the fiber at a different time such that they become mutually incoherent. Without mode dispersion all modes interfere resulting in speckle. With modal dispersion, the modes having a similar propagation velocity interfere more and the modes with different propagation velocity interfere less. As such, a (simplified) description is that closely neighboring modes interfere, providing a speckle pattern. The speckle pattern of mode 1:n is different to the speckle pattern of mode N:N+n. The speckle patterns add up in intensity providing a smooth intensity profile. In such way the speckle patterns will be smeared out, leading to an output beam with low speckle contrast.

It is proposed herein to use an engineered diffuser which has a defined angle and far field profile. The engineered diffuser can be used to shape the illumination pupil to achieve one or both of: 1) scrambling coherence and in particular optimized scrambling of coherence, and 2) reducing illumination efficiency and light loss, by shaping the pupil to have more illumination (or only illumination) at angles used for a particular application (e.g., overlay measurement).

Figure 8:
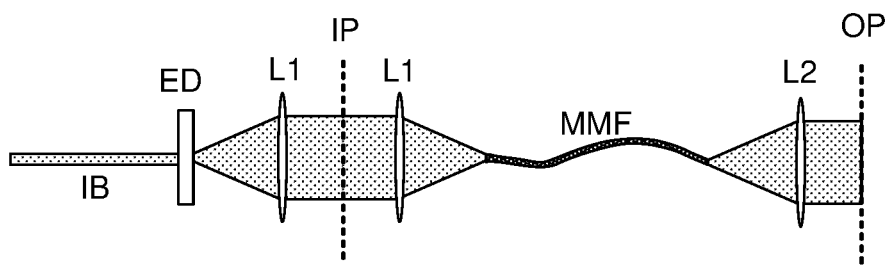
FIG. 8 illustrates an arrangement for reducing spatial coherence of source radiation according to an embodiment of the invention.

FIG. 8 illustrates the basic arrangement for many of the embodiments described below. An engineered diffuser ED diffuses the input beam IB according to an engineered defined angle and far field profile, which is imposed on an input pupil IP of a multimode fiber MMF, thereby shaping this pupil in a desired or determined manner A lens system L1 collects and refocuses the diffused radiation onto an input of the multimode fiber MMF. A second lens system collects the radiation from the multimode fiber MMF. An output pupil OP of the multimode fiber MMF will have an intensity profile dependent on the input pupil IP profile and any losses within the multimode fiber MMF. Note that the term input pupil and output pupil are defined in terms of the pupil shaping arrangement, rather than any metrology device that such a pupil shaping arrangement may be used in combination with. As such, where a multimode fiber is used, the input pupil and output pupil are defined with respect to the multimode fiber. In embodiments without a multimode fiber, the output pupil relates to the output of the engineered diffuser. In either case, the output pupil may then be used (e.g., focused) to form an input beam (input illumination) for a metrology device, such as any of the metrology devices described above.

FIG. 9 illustrates an arrangement where the engineered diffuser ED comprises a Gaussian far field profile, resulting in the input pupil IP having lower intensities at higher angles. FIG. 9(a) shows the input pupil cross-section $IP_{CS}$ (intensity against cross-section position) consequent from using a Gaussian engineered diffuser ED. An issue for a standard engineered diffuser profile with Gaussian profile, is that higher-order modes, which have higher intensity near the edge of the fiber, have higher energy loss (e.g. due to fiber bending) than lower-order modes within a multimode fiber MMF. A consequence of this is the output pupil cross-section $OP_{CS}$ will be "narrower", i.e., will have further intensity reduction at higher angles.

With respect to the concept of speckle reduction via modal dispersion as described above, the lowest speckle contrast is only obtained if all the modes in the fiber have equal intensity (overall energy); i.e., the output beam at the fiber end can be smoothed most effectively by summing up the random speckle patterns of modes having substantially equal intensity. However, the higher the mode, the more that the radiation will be distributed to angles nearer the pupil periphery and consequently attenuated within the fiber.

FIG. 9(b) illustrates the effect of higher attenuation of the higher orders within the multimode fiber, where the balance between mode intensities is lost and a larger speckle contrast results than would be obtained with balanced mode intensities. FIG. 9(b) shows an intensity plot of interference of the faster modes (e.g., mode 1 M1, mode 2 M2) which reach the end of the multimode fiber MMF more quickly and an equivalent plot for interference of the slower (higher) modes Mn, Mn+1. The result of the strong (average) intensity variation between modes is a significant intensity variation in the summed profile. Therefore, while a standard engineered diffuser which delivers Gaussian far-field profile can be used, improved performance may be achieved by using a non-standard (customized) engineered diffuser with optimized far-field profile.

FIG. 10 illustrates two such optimized engineered diffusers ED which can be used in the arrangement of FIG. 8. As with the Gaussian engineered diffuser, these engineered diffusers may be used statically or, to increase coherence scrambling further, dynamically (e.g., by rotating the engineered diffuser ED).

In FIG. 10(a) the input pupil cross-section $IP_{CS}$ shows a flat-top profile; i.e., substantially equal intensity across the entire input pupil IP. This results in a broadening of the output pupil cross section $OP_{CS}$ (more radiation at wider angles of the output pupil) with respect to the output pupil cross section $OP_{CS}$ of the Gaussian engineered diffuser shown in FIG. 9(a).

FIG. 10(b) shows an input pupil cross-section $IP_{CS}$ with a further enhanced profile which compensates for the fiber losses within the multimode fiber MMF. As fiber losses are greater at larger angles, it is proposed to engineer the diffuser such that the input pupil IP has greater intensity at larger angles. In an embodiment, this input pupil profile $IP_{CS}$ of the engineered diffuser may be configured to compensate exactly (i.e., as much as possible) for the energy loss, such that the output pupil cross-section $OP_{CS}$ after fiber losses is flat (of even intensity), as shown.

Depending on the specification of the fiber (e.g., diameter, length, core shape, etc.), the loss at higher modes (angles) can vary. Therefore, in an embodiment, it is proposed to use the output pupil profile as a measure for the mode intensity distribution, and design a customized engineered diffuser based on this measure, such that the output pupil has a flat (or otherwise optimized) intensity profile. By doing so, all the modes in the fiber have equal energy distribution, ensuring the lowest speckle contrast, as illustrated in FIG. 10(c).

Figure 11A:
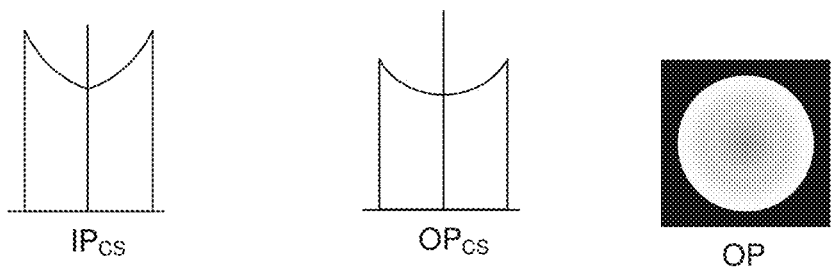
FIGS. 11A-11B illustrate plots of intensity across the cross section of the input pupil and output pupil for two further alternative customized engineered diffusers used in accordance with embodiments of the invention.

FIG. 11 illustrates a further embodiment, for which the engineered diffuser is customized to provide an input pupil profile $IP_{CS}$ which over-compensates for energy loss at high angles within the multimode fiber, such that the output pupil profile $OP_{CS}$ is not flat, but instead has higher intensity nearer the edge of the output pupil OP. FIG. 11(a) shows a first exemplary input pupil cross section $IP_{CS}$; and corresponding output pupil cross section $OP_{CS}$ and output pupil OP for such an arrangement.

Figure 11B:
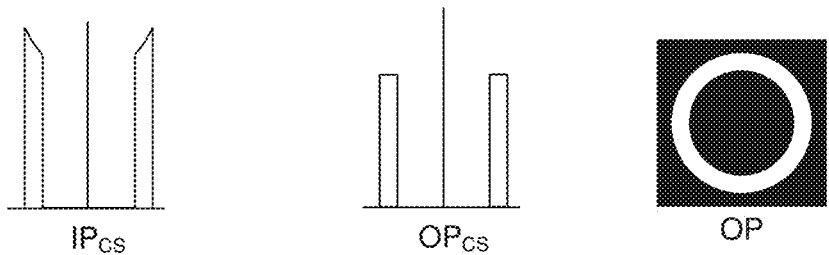

FIG. 11(b) shows equivalent profiles for another embodiment, where this concept is taken further, such that the engineered diffuser imparts an annular input pupil profile $IP_{CS}$, therefore providing an (attenuated) annular output pupil profile $OP_{CS}$ and output pupil OP. In a refinement of such an embodiment (as is illustrated), the intensity distribution in the annular region of the input pupil may increase towards the pupil periphery with a gradient configured (i.e., to compensate for fiber losses) for a substantially even intensity within the annular region of the output pupil.

A main application of any of the arrangements described in relation to FIG. 11 is for performing asymmetry based metrology, as might be performed using the metrology device of FIG. 5(a), for example. Asymmetry metrology measures asymmetry in diffracted radiation from a structure, to infer asymmetry within the structure (i.e., the degree to which the structure is asymmetric). Such asymmetry measurements are typically performed to measure overlay on overlay targets comprising a pair of overlaid gratings, for example, as such overlaid gratings will have an overlay dependent asymmetry which can be measured. Depending on the measurement technique (dark-field or angle resolved), such overlay measurements may be referred to as micro-diffraction based overlay (μDBO) or at resolution overlay (ARO); the essential techniques for either are well known. Such asymmetry measurements may also be used to infer back focus or dose used during formation of a focus or dose target which are imaged with a focus and/or dose dependent asymmetry.

The advantage of providing greater (or only) intensity at the periphery of the pupil for such applications is that the asymmetry information being measured is usually located predominately (or only) at the edge of the pupil. Therefore, by increasing intensity at the pupil periphery with respect to the remainder of the pupil (or conversely reducing the intensity of the remainder of the pupil with respect to the periphery), the source power and/or acquisition time could be reduced, and/or the signal to noise ratio improved. This may be particularly applicable for micro-DBO (μDBO) where the targets are typically smaller than the measurement spot and typically have a large wavelength-to-pitch ratio, which means that the first orders are only captured at the periphery of the pupil. For ARO or any other pupil based overlay measurement scheme, the so-called "tonsil areas", which are at the pupil periphery, often comprise most overlay information. ARO is an overlay method for small pitches, where visible light only provides a 'zeroth diffraction order'. In ARO the asymmetry in this zeroth order (pupil) is a measure for overlay.

Figure 12A:
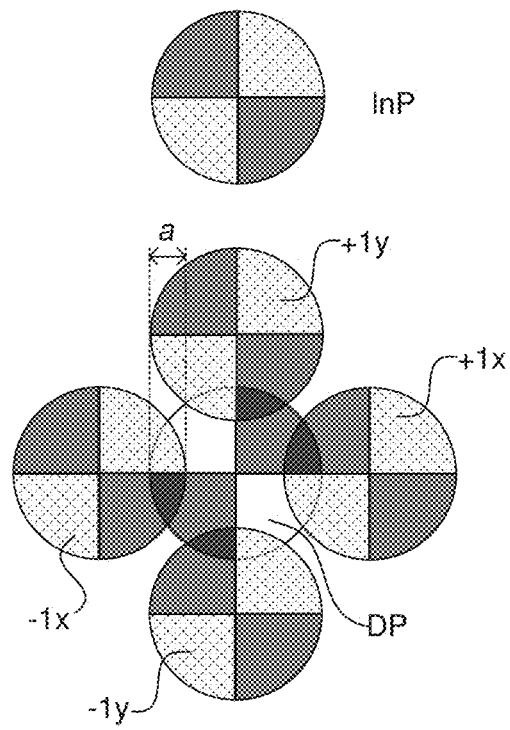
FIGS. 12A-12B illumination pupil and detection pupil and captured diffraction orders within a metrology device such as that of FIG. 5A, for 12A a conventional metrology arrangement.

FIG. 12 illustrates these concepts and the potential for reducing source power using some of the methods described herein. FIG. 12(a) illustrates the illumination pupil InP, detection pupil DP and diffraction orders +1x, −1x, +1y, −1y of a particular exemplary μDBO measurement using illumination without pupil shaping techniques as disclosed herein. In FIG. 12, darker shading illustrates unavailable regions of the pupil (i.e., from either the detection or illumination perspective as appropriate), no shading illustrates the available regions of the pupil and lighter shading illustrates illuminated regions. As is known, the input pupil InP and detection pupil DP each comprise respective pairs of opposing quadrants of the available NA, thereby dividing the NA equally between illumination and detection. It can be seen that there is only a small overlap (of width a) between each diffraction order and the available quadrants forming the detection pupil DP.

Figure 12B:
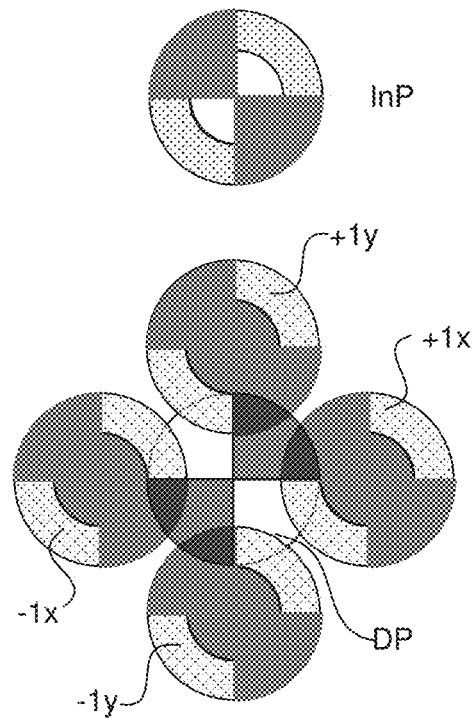

FIG. 12(b) shows that the same arrangement, but with an annular illumination profile (i.e., the output pupil profile of FIG. 11(b), although the output pupil profile of FIG. 11(a) is applicable with less source power reduction). Here, the width of the annular region is configured to be the dimension a corresponding with the degree of overlap between the detection pupil and diffraction orders. Of course, the annular width determined by the engineered diffuser may be individually configured for different wavelengths and/or pitches, or comprise a range covering all used wavelength/pitch ratios. By only providing radiation within the used annular region or reducing the intensity inside of the annular region, the source power may be reduced, and/or concentrated within the region to reduce acquisition time.

Figure 13A:
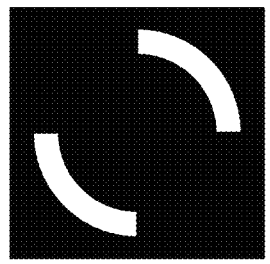
FIGS. 13A-13B illustrate the output pupil for two yet further alternative customized engineered diffusers used in accordance with embodiments of the invention.
Figure 13B:
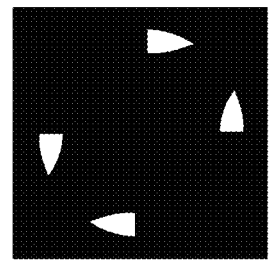

FIG. 13 illustrates that the engineered diffuser can provide non-rotationally symmetrical shapes. FIG. 13(a) illustrates a resultant output pupil profile with radiation only at angles coinciding with the used quadrants (illumination pupil quadrants) of the annular region, thereby reducing the source requirements further. This can be further refined according to FIG. 13(b) where the illuminated angles are configured to coincide only with the regions of overlap of the diffracted orders to be detected and the detection pupil (or at least to reduce illumination outside of these regions). A downside with non-symmetrical pupil shaping is that a multimode fiber cannot now be used, and as a result the speckle reduction will be less. As such, it should be noted that the output pupil OP here, as before, refers to the output of the pupil shaping arrangement generally. However, in this embodiment these output pupils OP are not the output pupils of the fiber as in the previous embodiments (as there is no fiber) but rather the output pupil after the engineered diffuser (and as such actually corresponds with the input pupil IP of FIG. 8). Also, rotating the diffuser would blur out these illumination regions. However, Optotune has developed a diffuser arrangement and method using electroactive polymers in which the diffuser is not rotated, but translated (e.g., the diffuser is mounted on an elastic membrane and moved back and forth between two positions using electroactive polymers). Such a method is described in the publication: J. Giger et al; *Laser Speckle Reduction based on electroactive polymers*; The 1st Advanced Lasers and Photon Sources (ALPS' 12), Yokohama, Japan, Apr. 26-Apr. 27, 2012; which is incorporated herein by reference and can be downloaded from: https://www.optotune.com/images/papers/120426%20Laser %20Speckle %20Reduction %20based %20on %20electroactive %20polymers.pdf. It is proposed that such a diffuser may be used in embodiments of the invention.

As such, the methods and arrangements described herein enable pupil shaping of the illumination radiation in metrology applications, thereby reducing the spatial coherence of such illumination radiation and therefore speckle effects, by using an engineered diffuser in combination with a multimode fiber. Embodiments of the method describe customizing the characteristics of the engineered diffuser to optimize the output pupil profile of the source arrangement to further minimize speckle contrast (equalize energy distribution between modes) and/or reduce source energy requirements.

With respect to the source energy reduction, it should be appreciated that presently, (e.g., in present apparatuses of the type illustrated in FIG. 5(a)) a flat top (or 'top-hat') pupil is typically generated firstly generating a larger pupil and cutting out a small portion of this. With a laser produced plasma source, this approach makes sense, because the etendue is large. However, alternative proposed sources have a low etendue, which makes it possible to directly shape a flat top pupil. As such, if the sensor fiber NA is 0.22 and the used NA 0.13, then the used percentage is only $0.13^2/0.22^2 \times 100\% = 35\%$. As a result the needed source power with flat-top shaping might require only 35% of what would be needed when the pupil would be overfilled.

Alternatively or in addition, using the concept illustrated in FIGS. 11(b) and 12(b) will also result in significant source power savings. If the overlap dimension a=NA/3, then the area of the annular region comprising illumination comprises 56% of the total illumination pupil. As a result the required source power may be only 56% of what would be needed when the total illumination pupil is filled. If we also take into account that we do not need to overfill the pupil (as just described), the required source power may be only $0.35*0.56 \times 100\% = 20\%$ of the required source power without shaping. Yet further source power reduction may be obtained using the techniques of FIG. 13.

In some EUV radiation sources the, source operation is monitored in part using a monitoring arrangement or device comprising a camera which monitors the tin droplets. Such a monitoring arrangement may use 'back light illumination', which for some wavelengths, may be created using a laser source and modal dispersion in a multimode fiber. As such, an application such as this could use the concepts described and disclosed. It will therefore be appreciated that the concepts described herein may find application in any device, such as any metrology or monitoring arrangement of any type and for any application, which requires (at least partially) spatially incoherent to operate.

Figure 14:
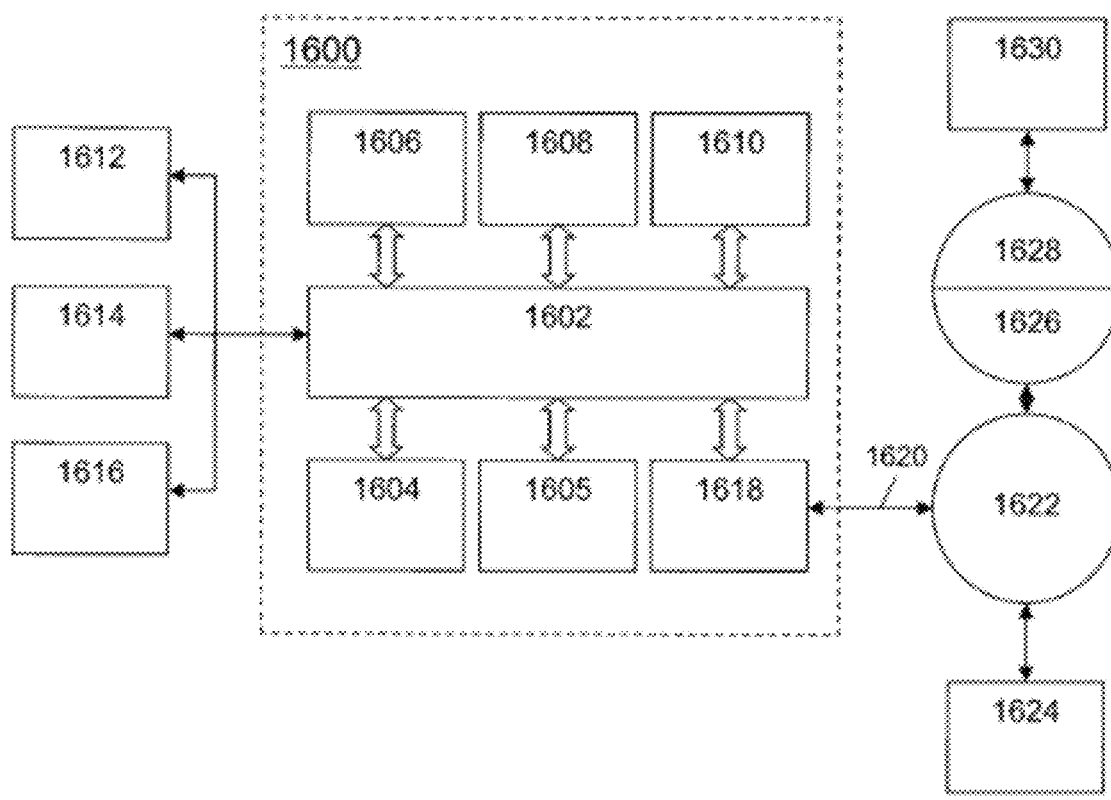
FIG. 14 is a block diagram, which illustrates a computer system that may assist in implementing the methods and flows disclosed herein.

FIG. 14 is a block diagram that illustrates a computer system 1600 that may assist in implementing the methods and flows disclosed herein. Computer system 1600 includes a bus 1602 or other communication mechanism for communicating information, and a processor 1604 (or multiple processors 1604 and 1605) coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT) or flat panel or touch panel display for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. A touch panel (screen) display may also be used as an input device.

One or more of the methods as described herein may be performed by computer system 1600 in response to processor 1604 executing one or more sequences of one or more instructions contained in main memory 1606. Such instructions may be read into main memory 1606 from another computer-readable medium, such as storage device 1610. Execution of the sequences of instructions contained in main memory 1606 causes processor 1604 to perform the process steps described herein. One or more processors in a multiprocessing arrangement may also be employed to execute the sequences of instructions contained in main memory 1606. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 1604 for execution. Such a medium may take many forms, including but not limited to, non-volatile media, volatile media, and transmission media. Non-volatile media include, for example, optical or magnetic disks, such as storage device 1610. Volatile media include dynamic memory, such as main memory 1606. Transmission media include coaxial cables, copper wire and fiber optics, including the wires that comprise bus 1602. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1604 for execution. For example, the instructions may initially be borne on a magnetic disk of a remote computer. The remote computer can load the instructions into its dynamic memory and send the instructions over a telephone line using a modem. A modem local to computer system 1600 can receive the data on the telephone line and use an infrared transmitter to convert the data to an infrared signal. An infrared detector coupled to bus 1602 can receive the data carried in the infrared signal and place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also preferably includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the worldwide packet data communication network, now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are exemplary forms of carrier waves transporting the information.

Computer system 1600 may send messages and receive data, including program code, through the network(s), network link 1620, and communication interface 1618. In the Internet example, a server 1630 might transmit a requested code for an application program through Internet 1628, ISP 1626, local network 1622 and communication interface 1618. One such downloaded application may provide for one or more of the techniques described herein, for example. The received code may be executed by processor 1604 as it is received, and/or stored in storage device 1610, or other non-volatile storage for later execution. In this manner, computer system 1600 may obtain application code in the form of a carrier wave.

Further embodiments are disclosed in the subsequent list of numbered clauses:

1. A pupil shaping arrangement for obtaining a defined pupil intensity profile for a metrology illumination beam configured for use in a metrology application, the pupil shaping arrangement comprising: an engineered diffuser having a defined far-field profile configured to impose said defined pupil intensity profile on said metrology illumination beam.
2. A pupil shaping arrangement as defined in clause 1, further comprising a multimode fiber located between the engineered diffuser and an output of the pupil shaping arrangement.
3. A pupil shaping arrangement as defined in clause 2, wherein the engineered diffuser is configured to impose a Gaussian pupil intensity profile on an input pupil of said multimode fiber.
4. A pupil shaping arrangement as defined in clause 2, wherein the engineered diffuser is configured to impose a flat pupil intensity profile on an input pupil of said multimode fiber, the flat pupil intensity profile comprising substantially constant intensity over the input pupil.
5. A pupil shaping arrangement as defined in clause 2, wherein the engineered diffuser is configured to impose a pupil intensity profile on the input pupil of said multimode fiber which is greater at a periphery of said input pupil with respect to an inner region of the input pupil.
6. A pupil shaping arrangement as defined in clause 5, wherein the engineered diffuser is configured to impose a pupil intensity profile on the input pupil of said multimode fiber which continuously increases from the center toward the periphery of said input pupil.
7. A pupil shaping arrangement as defined in clause 6, wherein said imposed pupil intensity profile is configured such that an output pupil of said multimode fiber comprises a substantially flat pupil intensity profile, comprising substantially constant intensity over the output pupil.
8. A pupil shaping arrangement as defined in clause 5 or 6, wherein said imposed pupil intensity profile is configured such that an output pupil of said multimode fiber comprises a pupil intensity profile which is greater at a periphery of said output pupil with respect to an inner region of the output pupil.
9. A pupil shaping arrangement as defined in clause 8, wherein said imposed pupil intensity profile is configured such that an output pupil of said multimode fiber comprises a pupil intensity profile which continuously increases from the center toward the periphery of said output pupil.
10. A pupil shaping arrangement as defined in clause 5, wherein the engineered diffuser is configured to impose an input annular pupil intensity profile on an input pupil of said multimode fiber, thereby resulting in an output annular pupil intensity profile of the output pupil.
11. A pupil shaping arrangement as defined in clause 10, wherein the input annular pupil intensity profile is configured such that the output annular pupil intensity profile has a substantially constant intensity over the annular region of the output annular pupil intensity profile.
12. A pupil shaping arrangement as defined in clause 10 or 11, wherein the annular region of the output annular pupil intensity profile is configured to coincide with or comprise an equivalent region of a detection pupil of a metrology device operable to use said metrology illumination beam, within which desired diffraction orders will be detected.
13. A pupil shaping arrangement as defined in any preceding clause, wherein the engineered diffuser is configured to be static.
14. A pupil shaping arrangement as defined in any preceding clause wherein the engineered diffuser is configured for rotational movement and/or move translational movement.
15. A pupil shaping arrangement as defined in clause 1, wherein the engineered diffuser is configured for translational movement and is configured to impose a non-rotationally symmetric pupil intensity profile on the said metrology illumination beam.
16. A pupil shaping arrangement as defined in clause 15, wherein regions of intensity of said non-rotationally symmetric pupil intensity profile are configured to coincide with or comprise an equivalent regions of a detection pupil of a metrology device operable to use said metrology illumination beam, within which desired diffraction orders will be detected.
17. A radiation source operable to output highly spatially coherent radiation and comprising a pupil shaping arrangement of any preceding clause, said pupil shaping arrangement being configured to reduce the spatial coherence of said highly spatially coherent radiation to provide said metrology illumination beam.

18. A metrology or monitoring device comprising the pupil shaping arrangement of any of clauses 1 to 16, or the radiation source of clause 17, and being configured to use said metrology illumination beam in performing a measurement or monitoring action.

19. A metrology or monitoring device as defined in clause 18, comprising one of a scatterometer metrology device for performing measurements for monitoring a lithographic process, an alignment sensor, a leveling sensor or a droplet monitoring device for an EUV radiation source.

20. A method of obtaining a defined pupil intensity profile for a metrology illumination beam for use in a metrology application, the method comprising:
diffusing said illumination beam with an engineered diffuser having a defined far-field profile to impose said defined pupil intensity profile on said metrology illumination beam.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A pupil shaping arrangement for obtaining a defined pupil intensity profile for a metrology illumination beam configured for use in a metrology application, the pupil shaping arrangement comprising:
an engineered diffuser having a defined far-field profile configured to impose the defined pupil intensity profile on the metrology illumination beam; and
a multimode fiber located between the engineered diffuser and an output of the pupil shaping arrangement;
wherein the engineered diffuser is configured to impose the pupil intensity profile on an input pupil of the multimode fiber that is greater at a periphery of the input pupil with respect to an inner region of the input pupil.

2. The pupil shaping arrangement of claim 1, wherein the engineered diffuser is configured to impose the pupil intensity profile on the input pupil of the multimode fiber that continuously increases from a center toward the periphery of the input pupil.

3. The pupil shaping arrangement of claim 2, wherein the imposed pupil intensity profile is configured such that an output pupil of the multimode fiber comprises a substantially flat pupil intensity profile, comprising substantially constant intensity over the output pupil.

4. The pupil shaping arrangement of claim 1, wherein:
the imposed pupil intensity profile is configured such that an output pupil of the multimode fiber comprises the pupil intensity profile that is greater at the periphery of the output pupil with respect to an inner region of the output pupil, and
the imposed pupil intensity profile is configured such that the output pupil of the multimode fiber comprises the pupil intensity profile that continuously increases from the center toward the periphery of the output pupil.

5. The pupil shaping arrangement of claim 1, wherein:
the engineered diffuser is configured to impose an input annular pupil intensity profile on the input pupil of the multimode fiber, thereby resulting in an output annular pupil intensity profile of an output pupil of the multimode fiber, and
the input annular pupil intensity profile is configured such that the output annular pupil intensity profile has a substantially constant intensity over an annular region of the output annular pupil intensity profile.

6. The pupil shaping arrangement of claim 5, wherein the annular region of the output annular pupil intensity profile is configured to coincide with or comprise an equivalent region of a detection pupil of a metrology device operable to use the metrology illumination beam, within that desired diffraction orders will be detected.

7. The pupil shaping arrangement of claim 1, wherein the engineered diffuser is configured to be static.

8. The pupil shaping arrangement of claim 1, wherein the engineered diffuser is configured for rotational movement and/or translational movement.

9. The pupil shaping arrangement of claim 1, wherein:
the engineered diffuser is configured for translational movement and is configured to impose a non-rotationally symmetric pupil intensity profile on the metrology illumination beam, and
regions of intensity of the non-rotationally symmetric pupil intensity profile are configured to coincide with or comprise equivalent regions of a detection pupil of a metrology device operable to use the metrology illumination beam, within that desired diffraction orders will be detected.

10. A radiation source operable to output highly spatially coherent radiation and comprising:
a pupil shaping arrangement configured to obtain a defined pupil intensity profile for a metrology illumination beam configured for use in a metrology application, the pupil shaping arrangement comprising:
an engineered diffuser having a defined far-field profile configured to impose the defined pupil intensity profile on the metrology illumination beam; and
a multimode fiber located between the engineered diffuser and an output of the pupil shaping arrangement;
wherein the pupil shaping arrangement is configured to reduce spatial coherence of the highly spatially coherent radiation to provide the metrology illumination beam; and wherein the engineered diffuser is configured to impose the pupil intensity profile on an input pupil of the multimode fiber that is greater at a periphery of the input pupil with respect to an inner region of the input pupil.

11. A device comprising:
a pupil shaping arrangement configured to obtain a defined pupil intensity profile for a metrology illumination beam configured for use in a metrology application, the pupil shaping arrangement comprising:
   an engineered diffuser having a defined far-field profile configured to impose the defined pupil intensity profile on the metrology illumination beam or a radiation source operable to output highly spatially coherent radiation; and
   a multimode fiber located between the engineered diffuser and an output of the pupil shaping arrangement;
wherein the pupil shaping arrangement is configured to reduce spatial coherence of the highly spatially coherent radiation to provide the metrology illumination beam and is configured to use the metrology illumination beam in performing a measurement or monitoring action; and
wherein the engineered diffuser is configured to impose the pupil intensity profile on an input pupil of the multimode fiber that is greater at a periphery of the input pupil with respect to an inner region of the input pupil.

\* \* \* \* \*

UNITED STATES PATENT AND TRADEMARK OFFICE
CERTIFICATE OF CORRECTION

PATENT NO. : 12,265,229 B2
APPLICATION NO. : 17/768851
DATED : April 1, 2025
INVENTOR(S) : Zhou et al.

Page 1 of 1

It is certified that error appears in the above-identified patent and that said Letters Patent is hereby corrected as shown below:

In the Specification

In Column 5, Line 7, delete "1/O2," and replace with --I/O2,--.

In Column 13, Line 57, delete "manner" and replace with --manner.--.

In Columns 16 & 17, Lines 67 & 1, delete "120426%20Laser %20Speckle %20Reduction %20based %20on %20electroactive %20polymers.pdf." and replace with --120426%20Laser%20Speckle%20Reduction%20based%20on%20electroactive%20polymers.pdf.--.

Signed and Sealed this
Twentieth Day of May, 2025

Coke Morgan Stewart
*Acting Director of the United States Patent and Trademark Office*